Patented Apr. 2, 1940

2,195,551

UNITED STATES PATENT OFFICE

2,195,551

EXPLOSIVE

Joseph A. Wyler, Allentown, Pa., assignor to Trojan Powder Company, Allentown, Pa.

No Drawing. Application February 20, 1939, Serial No. 257,484

4 Claims. (Cl. 52—5)

This invention relates to a new explosive. More specifically it relates to dimethylol-nitro-methyl-methane-dinitrate.

It is an object of this invention to prepare a new compound which may be designated as dimethylol-nitro-methyl-methane-dinitrate. A further object is to provide a suitable process for nitrating dimethylol-nitro-methyl-methane to this dinitrate compound. Other and further objects will become apparent upon a perusal of this specification and claims.

I have discovered that it is possible to nitrate dimethylol-nitro-methyl-methane to the dinitrate with excellent yields. The chemical formula for dimethylol-nitro-methyl-methane is:

$$(CH_2OH)_2C \cdot (NO_2)CH_3$$

of the dinitrate is:

$$(CH_2NO_3)_2C \cdot (NO_2)CH_3$$

and the chemical reaction involved in my process of nitration is:

$$(CH_2OH)_2 \cdot C(NO_2) \cdot CH_3 + 2HNO_3 = (CH_2NO_3)_2 \cdot C(NO_2) \cdot CH_3 + 2H_2O$$

In carrying out this nitration I prefer to use a mixture of nitric acid and a dehydrating agent such as sulphuric or phosphoric acid, adding the dimethylol-nitro-methyl-methane to the nitrating acid at a low temperature, separating the nitrated product from the spent acid, washing, and stabilizing.

In order more clearly to point out my invention, the following illustrative examples, in which all parts are by weight, are given:

Example #1

110 parts of dry dimethylol-nitro-methyl-methane are added, with stirring, to 440 parts of 93% HNO₃ at about 10-30° C. Then 290 parts of oil of vitriol are slowly added, maintaining the temperature preferably below 20° C. The mixture is stirred for an additional half hour, when it is drowned in a large excess of cold water. This drowning precipitates the dinitrate compound as fine, white crystals. These are filtered off, washed with water, treated with about four times their weight of a .1% aqueous solution of Na₂CO₃ to destroy all free acid and to stabilize the dinitrate, washed with water and dried at a temperature below 39° C. The yield of dimethylol-nitro-methyl-methane-dinitrate obtained is over 90% of theory.

Example #2

180 parts of dry dimethylol-nitro-methyl-methane are added, with stirring, to 1000 parts of a mixed acid consisting of 50% HNO₃ and 50% H₂SO₄. The temperature of nitration is kept below 30° C. and the mixture stirred for about one-half hour after all the dimethylol-nitro-methyl-methane is added. The contents of the nitrator are then allowed to separate into two layers. The upper layer is the dinitrate and the lower layer is the spent acid containing a small amount of the dinitrate in solution. In such cases where the temperature of nitration is less than 10° C., the dimethylol-nitro-methyl-methane-dinitrate separates as a crystalline precipitate, whereas at temperatures above, say, 15° C. the dimethylol-nitro-methyl-methane-dinitrate separates as a liquid upper layer containing some mixed acid. By a careful selection of proportions of reactants it is possible to obtain yields of over 80% of theory of the dinitrate, with the added advantage that the dinitrate is separated from the spent acid without the necessity of further dilution of this acid with water, thus effecting a distinct saving in the cost of recovery of the spent acid.

The separated dinitrate is washed in water, neutralized with a dilute alkali, etc. as described in Example 1.

Example #3

200 parts of dry dimethylol-nitro-methyl-methane are added, with stirring, to 1000 parts of a mixed acid consisting of 60% HNO₃ and 40% H₃PO₄ and the process carried out in essentially the same manner as in Example 2, except that in this case the whole nitration mixture was drowned in a large excess of water in order to recover the dinitrate. The latter is then washed, etc., as in Example 1. The yield in this case was over 90% of theory.

In the examples mentioned I used a dimethylol-nitro-methyl-methane of the structural formula:

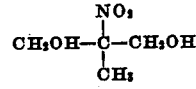

but I may also use one of the formula:

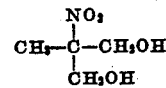

The dinitrate which was made in accordance with the above examples has the following structural formula:

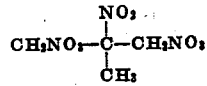

It is a white solid having a melting point of approximately 39.5° C., forms prismatic needle crystals, is soluble in alcohol, acetone, toluol, ethyl acetate, and practically insoluble in water and in carbon tetrachloride. It does not dissolve in molten paraffin, and does not dissolve much trinitrotoluene or pentaerythritol tetranitrate at 40°-50° C. It is very insensitive to impact (a 10 kg. weight dropping 100 cm. does not cause a detonation) and to friction; and 10 gms. of it develops upon explosion a gas volume equivalent to approximately 13.4 gms. trinitrotoluene as measured in the ballistic pendulum apparatus in general use in the explosive industry. Its brisance is greater than that of trinitrotoluene, its nitrate nitrogen is 12.45% $N_2$, and its stability toward heat is satisfactory. It melts and casts readily, and since it is insensitive to impact and friction it should be useful in military as well as commercial explosives.

When it is desired to use the dimethylol-nitro-methyl-methane-dinitrate in the form of rather thickened prisms instead of the fine prismatic needles the dinitrate may be crystallized out of a solvent such as ethyl alcohol, filtered off and dried. These crystals enable one to obtain certain packing or pressing densities which in turn affect the explosive properties of the composition in which they are used.

As indicated above, the examples are merely illustrative of my invention and are not intended to limit me to the specific operative conditions mentioned. I may, for instance, use nitrating acids containing varying amounts of water; vary the proportions of reactants, modify the method of separating the nitrated product from its spent acid, etc., without departing from the essence of my invention, and I do not limit myself except as indicated in the appended claims.

I claim:
1. Dimethylol-nitro-methyl-methane dinitrate.
2. The compound of formula:

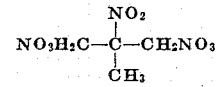

3. A dimethylol-nitro-methyl-methane-dinitrate having a melting point of approximately 39.5° C. and whose crystals are prismatic.
4. An explosive comprising dimethylol-nitro-methyl-methane-dinitrate.

JOSEPH A. WYLER.